(12) United States Patent
Kim et al.

(10) Patent No.: US 8,114,941 B2
(45) Date of Patent: Feb. 14, 2012

(54) POLYAMIDE RESIN COMPOSITION

(75) Inventors: Dae Sik Kim, Gyeonggi-do (KR); Hee Sok Chang, Gyeonggi-do (KR); Bong Hwan Oh, Incheon (KR)

(73) Assignees: Hyundai Motor Company, Seoul (KR); Kopla Co., Ltd., Siheung-si, Gyeonggi-do (KR)

( * ) Notice: Subject to any disclaimer, the term of this patent is extended or adjusted under 35 U.S.C. 154(b) by 954 days.

(21) Appl. No.: 12/151,373

(22) Filed: May 5, 2008

(65) Prior Publication Data

US 2011/0060079 A1    Mar. 10, 2011

(30) Foreign Application Priority Data

Dec. 13, 2007   (KR) .................. 10-2007-0130197

(51) Int. Cl.
*C08K 5/3435* (2006.01)
*C08L 77/02* (2006.01)
*C08L 65/00* (2006.01)

(52) U.S. Cl. ..................... 525/185; 524/114; 524/494

(58) Field of Classification Search ................ 525/185; 524/114, 494

See application file for complete search history.

(56) References Cited

U.S. PATENT DOCUMENTS 5,270,401 A * 12/1993 Sham et al. ................ 525/420

FOREIGN PATENT DOCUMENTS

| JP | 64-000153 | 1/1989 |
| JP | 04-136032 | 5/1992 |
| KR | 10-1990-0007959 | 6/1990 |

* cited by examiner

*Primary Examiner* — Kelechi Egwim
(74) *Attorney, Agent, or Firm* — Edwards Wildman Palmer LLP; Peter F. Corless

(57) ABSTRACT

The present invention provides a polyamide resin composition comprising a resin of polyamide and polyacrylate mixed with a compatibilizer, an inorganic nucleating agent, a glass fiber, an antioxidant, an anti-hydrolysis agent and a lubricant in a predetermined ratio, which shows superior mechanical strength and heat resistance and improved glycol resistance and visibility maintenance, thus being useful in such a field that requires the aforementioned properties, for example in an automobile coolant reservoir tank.

13 Claims, No Drawings

POLYAMIDE RESIN COMPOSITION

CROSS-REFERENCE TO RELATED APPLICATION

This application claims priority under 35 U.S.C. §119(a) of Korean Patent Application No. 10-2007-0130197 filed on Dec. 13, 2007, the entire contents of which are incorporated herein by reference.

BACKGROUND (a) Technical Field

The present invention provides a polyamide resin composition that shows superior mechanical strength and heat resistance as well as improved glycol resistance and visibility maintenance, thus being useful in such a field that requires the aforementioned properties, for example in an automobile coolant reservoir tank.

(b) Background Art

In general, polyamide resin composition has superior mechanical property, heat resistance and drug resistance among various crystalline resins. Desired properties of polyamide resin composition may be achieved by addition of inorganic filling material such as glass fiber, carbon fiber, talc, wollastonite, calcium carbonate and barium sulfate. Further, physical and chemical resistance may be increased by addition of various functional additives. In addition, polyamide resin composition has superior processability, light weight, various and convenient design effect. Thus, it has been widely applied to various industrial fields such as automobile, ship and airplanes.

Polyamide 66 resin has been used to prepare a tank for supplementing an aqueous solution containing an anti-freezing solution (e.g., 50 vol %) of automobile engine cooling radiator. Polyamide 66 resin, however, shows a relatively high equilibrium moisture absorption and tends to undergo primary hydrolysis due to hot water (heated cooling water). The hydrolysis causes cleavage in intermolecular hydrogen bonding, producing molecules with lower molecular weight. On the other hand, ethylene glycol, which is a main ingredient of an anti-freezing solution contained in cooling water, causes glycolysis, converting amide group in polyamide resin into a compound having primary amine group and an ester compound having β-hydroxyethyl group. The thus-produced ultra-low-molecular-weight molecules decrease intermolecular binding and increase gaps between resin molecules, thereby inducing light scattering and lowering light transmittance and deteriorating visibility.

Further, pigments such as green dyes added in an anti-freezing solution are repeatedly pigmented onto the inner wall of cooler supplementing tank in a standstill state where heated cooling water is stationary. This may make it difficult to estimate the exact water level or may even lead to misread as if the tank is filled with a certain level of cooling water.

The aforementioned decrease in tank visibility or misreading of water level may prevent cooling water from being supplemented at the right time, thereby causing engine overheat or engine stop.

Researches have been made to improve the visibility of polyamide 66 resin such as heat resistance, glycol resistance and pigmentation resistance and achieved the improvement, to some extent, in its initial visibility and initial light transmittance. They, however, have not improved visibility maintenance with regard to heat resistance, anti-freezing solution resistance and pigmentation resistance.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been conceived to solve the aforementioned problems associated with prior art.

One of the objects of the present invention is to provide a polyamide composition with improved visibility maintenance, which is useful for preparing automobile coolant reservoir tanks. The composition has superior heat resistance, glycol resistance and pigmentation resistance, and also meets the mechanical properties required for a material for automobile coolant reservoir tank. In particular, it has not only superior heat resistance, glycol resistance and pigmentation resistance (or coloration resistance) but also superior mechanical properties such as tensile strength and flexural strength, which are suitable for automobile coolant reservoir tanks, due to synergism of micro-dispersion effect and laminating effect. In one aspect, the present invention provides a polyamide resin composition comprising: (a) 100 weight parts of a resin comprising a polyamide 66 resin and a modified polyacrylate resin in a weight ratio of 80:20-95:5; (b) 0.03-0.3 weight parts of a glycidyl-based compatibilizer; (c) 20-40 weight parts of a glass fiber having a particle diameter of 7-14 μm and being coated with 0.05-0.5 wt % of a coupling agent; (d) 0.5-5.0 weight parts of an inorganic nucleating agent; (e) 0.1-0.8 weight parts of an antioxidant; (f) 0.5-4.0 weight parts of an imide-based anti-hydrolysis agent; and (g) 0.1-1 weight parts of a lubricant.

In another aspect, the present invention provides a process of preparing a polyamide resin composition, which comprises: (a) introducing a mixture with the above composition; and (b) melt-mixing and extruding the mixture at a temperature of 240-300° C. and a screw rotation speed of 250-400 rpm.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above and other features and advantages of the present invention will be apparent from or are set forth in more detail in the following Detailed Description, which serves to explain by way of example the principles of the present invention.

DETAILED DESCRIPTION

Reference will now be made in detail to the preferred embodiments of the present invention.

In a preferred embodiment, the present invention provides a polyamide resin composition which comprises a mixture, as polyamide resin, of polyamide 66 resin with superior heat resistance and modified polyacrylate resin having superior heat resistance chemical resistance and pigmentation resistance; a reinforced glass fiber coated with coupling agent; a glycidyl-based reactive compatibilizer for improving compatibility between two different polymers; tetramethyl-based and phosphite-based antioxidant(s); an imide-based anti-hydrolysis agent; a magnesium-based nucleating agent as an inorganic nucleating agent; and an olefin-based lubricant, which is useful for an automobile coolant reservoir tank with improved visibility maintenance and increased heat resistance, glycol resistance and coloration resistance.

In the preferred embodiment, a mixture of polyamide resin and modified polyacrylate resin is used as a base resin of the polyamide resin composition.

A polyamide resin with a melting point of 240° C. or higher, preferably 260° C. or higher, is preferred for increasing heat resistance. For example, polyamide 66 having a melting point of 262° C. may be used.

A polyacrylate resin, generally, has superior chemical resistance and drug resistance. It is used herein for increasing chemical resistance (glycol resistance). However, it may lower mechanical property due to insufficient compatibility with polyamide resin. To overcome this problem, the difference in melting point between the polyacrylate resin and the polyamide resin is preferred to be 40° C. or less, preferably 20° C. or less, more preferably 10° C. or less. Therefore, the melting point of the modified polyacrylate resin herein is preferably 240-280° C., more preferably 260-270° C.

The melt index of the polyamide resin and the modified polyacrylate resin is preferably 5-30 g/10 minutes (measured at 270° C. and 2.16 kg), more preferably 10-20 g/10 minutes (measured at 270° C. and 2.16 kg).

A polyamide resin composition having superior heat resistance, glycol resistance and pigmentation resistance may be produced by using a mixture of the two different resins, i.e. polyamide resin and a modified polyacrylate.

The polyamide resin and the modified polyacrylate resin are mixed with in a weight ratio of preferably 80:20-95:5, preferably 85:15-95:5. When the portion of the polyamide is less than 80 weight ratio, the mechanical property of the composition may be deteriorated and the manufacturing cost may increase. When the portion of the polyamide is higher than 95 weight ratio, the heat resistance, glycol resistance and pigmentation resistance may decrease.

A compatibilizer is used to increase the compatibility between the polyamide resin and the modified polyacrylate resin. Preferably, glycidyl-based compatibilizer is used for improving heat resistance and chemical resistance, thereby increasing visibility maintenance. A preferable amount of the compatibilizer is 0.03-0.3 weight parts, more preferably 0.05-0.15 weight parts relative to 100 weight parts of the mixture of polyamide resin and modified polyacrylate resin. When the amount is less than 0.03 weight parts, heat resistance and dispersibility may become unsatisfactory. When the amount is more than 0.3 weight parts, fluidity may decrease due to excessive crosslinking, thus lowering product appearance.

Non-limiting preferred examples of glycidyl-based reactive compatibilizer include glycidyl methacrylate, ethylene glycidyl methacrylate and a mixture thereof.

A glass fiber used in the preferred embodiment has a particle diameter of 7-14 μm, preferably 10-12 μm. Preferably, the glass fiber is coated with a coupling agent to increase the compatibility between glass fiber and resin. The amount of the coupling agent is 0.05-0.5 wt %, preferably 0.08-0.2 wt %, more preferably 0.1-0.15 wt % relative to total weight of the glass fiber containing coupling agent. Silane-based coupling agent and epoxy silane, for example, are preferred.

When a particle diameter of glass fiber is lower than 7 μm, mechanical strength may decrease due to high fracture rate of glass fiber. When it is higher than 14 μm, product appearance may drastically decrease due to excessive orientation of glass fiber. When the amount of the coupling agent is less than 0.05 wt %, mechanical strength and chemical resistance may become unsatisfactory. When it is higher than 0.5 wt %, processability may decrease due to increased viscosity.

The glass fiber may be used in the amount of 20-40 weight parts, preferably 25-35 weight parts relative to 100 weight parts of the mixture of polyamide resin and modified polyacrylate resin. When the amount is less than 20 weight parts, heat resistance and mechanical strength may deteriorate. When it is more than 40 weight parts, product appearance and initial visibility (light transmittance) may be lowered.

A nucleating agent is used to maintain initial visibility (light transmittance) and visibility caused by heat aging resistance. Inorganic nucleating agent, e.g., magnesium-based nucleating agent, is preferred to be used in the amount of 0.5-5 weight parts, more preferably 1-3 weight parts relative to 100 weight parts of the mixture of polyamide resin and modified polyacrylate resin. When the amount is less than 0.5 weight parts, the improvement in visibility caused by heat aging resistance initial visibility may become insufficient. When the amount is more than 5 weight parts, mechanical strength may deteriorate.

An oxidant used herein is a mixture of a primary antioxidant for inhibiting the generation of radicals and a secondary antioxidant for removing the radicals. A preferred example of the primary antioxidant is tetramethyl-based antioxidant (photo-stabilizer), which may increase heat resistance and water resistance. A preferred example of the secondary antioxidant is phosphite-based antioxidant. Preferable ratio of primary antioxidant and secondary antioxidant is 2:1-1:2. The amount of the antioxidant is 0.1-0.8 weight parts, preferably 0.2-0.6 weight parts relative to 100 weight parts of the mixture of polyamide resin and modified polyacrylate resin. The primary antioxidant is used in the amount of 0.1-0.5 weight parts relative to 100 weight parts of the mixture of polyamide resin and modified polyacrylate resin. When the amount is less than 0.1 weight parts, heat aging resistance and water resistance may decrease. When the amount is more than 0.5 weight parts, properties and product appearance may deteriorate. As the tetramethyl-based antioxidant, bis-2,2,6,6-tetramethyl-4-piperidinyl-1,3-benzene dicarboxamide having superior heat resistance and light resistance is preferably used.

The secondary antioxidant is used in the amount of 0.1-0.5 weight parts relative to 100 weight parts of the mixture of polyamide resin and modified polyacrylate resin. When the amount is less than 0.1 weight parts, heat aging resistance may decrease. When the amount is more than 0.5 weight parts, properties and product appearance may deteriorate. Examples of the phosphite-based antioxidant include tris-(2,4-di-t-butylphenyl)-phosphite, tetrakis-(2,4-di-t-butylphenyl)-4,4'-biphenylene diphosphite and a mixture thereof.

An imide-based anti-hydrolysis agent is used to inhibit the hydrolysis between polyamide molecules. The imide-based anti-hydrolysis agent is used in the amount of 0.5-4 weight parts, preferably 1-2 weight parts relative to 100 weight parts of the mixture of polyamide resin and modified polyacrylate resin. When the amount is less than 0.5 weight parts, the effect of hydrolysis resistance may become insufficient, thereby failing to substantially improve glycol resistance. When the amount is more than 4 weight parts, product appearance and properties may deteriorate. Examples of imide-based anti-hydrolysis agent include aromatic carbodiimide, aliphatic carbodiimide and a mixture thereof.

An olefin-based lubricant is used for improving the fluidity, release properties and visibility. The lubricant is used in 0.1-1 weight parts, preferably 0.2-0.5 weight parts relative to 100 weight parts of the mixture of polyamide resin and modified polyacrylate resin. When the amount is less than 0.1 weight parts, release effect and initial visibility (light transmittance) may deteriorate. When the amount is more than 1 weight part, properties and weld strength may become unsatisfactory. As an olefin-based lubricant, ethylene bisteramide is preferred.

In another aspect, the present invention provides a process for preparing the polyamide resin composition. In a preferred embodiment, general extrusion method by using a double screw extruder is used.

More particularly, a mixture of polyamide resin and modified polyacrylate resin, inorganic nucleating agent, antioxidant, imide-based anti-hydrolysis agent and lubricant are weighed, and a predetermined amount of each ingredient is introduced through a main inlet of a double screw extruder. 20-40 weight parts of glass fiber (particle diameter: 7-14 μm) coated with 0.05-0.5 wt % of silane-based coupling agent is introduced through a secondary side inlet. The double screw extruder has L/D 30-45, more preferably 40-45 and a diameter (D) of 60-100, preferably 70-90, more preferably 75-85 mm.

A polyamide resin composition is prepared by conducting melt-mixing step, cooling step using a strand-type water bath, pelletizing step, screening step and dehumidifying and drying step, while maintaining the extruder cylinder temperature at 240-300° C., preferably 260-290° C., more preferably 265-285° C. and the screw rotation speed at 250-400 rpm, preferably 300-350 rpm. When the cylinder temperature is lower than 240° C., a required level of chemical resistance and visibility may not be obtained, and physical properties may deteriorate due to aggravated fracture of glass fiber. When the temperature is higher than 300° C., thermal deterioration occurs and impurities (decomposed products) are produced, deteriorating product appearance. When the screw rotation speed is less than 250 rpm, the same phenomena as at a temperature of higher than 300° C. may occur because self purging period and retention time are extended. When the speed is higher than 400 rpm, the same phenomena as at a temperature of lower than 240° C. may occur because the fracture of glass fiber aggravates.

As described above, the polyamide resin composition according to the preferred embodiment have superior visibility maintenance with regard to heat resistance, glycol resistance, and pigmentation resistance, while having mechanical properties such as tensile strength and flexural strength similar to those of conventional polyamide resin compositions.

Therefore, polyamide resin composition herein is useful in such a field that requires the aforementioned properties, for example in an automobile coolant reservoir tank. In particular, an automobile coolant reservoir tank prepared by using a polyamide resin composition herein may have a required level of visibility maintenance, while showing superior mechanical properties such as tensile strength and flexural strength.

EXAMPLES

The present invention is illustrated with reference to the following examples but they should not be construed as limiting the scope of the present invention.

In Examples and Comparative Examples, STABAMID 24 (Rhodia, France) was used as a polyamide 66 resin (PA-66) and AX1500 (Unitika Corp.) was used as a modified polyacrylate resin (PAR). As a glycidyl-based compatibilizer, glycidyl methacrylate was used. As an inorganic nucleating agent, KC2000 (KOCH Corp.), a magnesium-based nucleating agent KC2000), was used. As an organic nucleating agent, a sorbitol-based organic nucleating agent was used. As a glass fiber, CS123D-10P (Owens Corning Corp.) was used as a glass fiber. Bis-2,2,6,6-tetramethyl-4-piperidinyl-1,3-benzenedicarboxamide was used as a tetramethyl-based antioxidant. Tris-(2,4-di-t-butylphenyl)-phosphite was used as a phosphite-based antioxidant. Poly(1,3,5-triisopropyl-phenylene-2,4-carbodiimide) was used as an imide-based anti-hydrolysis agent. Ethylene bisteramide was used as olefin-based lubricant.

Examples 1-2 and Comparative Examples 1-7

The polyamide 66 resin, modified polyacrylate resin, glycidyl-based compatibilizer, inorganic nucleating agent, organic nucleating agent, tetramethyl-based antioxidant, phosphite-based antioxidant, imide-based anti-hydrolysis agent and olefin-based lubricant in the ratio shown in Table 1 below were introduced to a double screw extruder with L/D 43 and D 75 mm through a main inlet. Glass fiber was introduced to the extruder through a secondary side inlet. The mixture was melt-mixed at 270° C., while maintaining a screw rotation speed of 350 rpm, to prepare polyamide resin compositions. The composition of Comparative Example 5 was prepared in the same manner as described in Example 1 except that the screw rotation speed was maintained at 450 rpm.

TABLE 1

| Ingredients (weight parts) | Ex. 1 | Ex. 2 | C. Ex. 1 | C. Ex. 2 | C. Ex. 3 | C. Ex. 4 | C. Ex. 5 | C. Ex. 6 | C. Ex. 7 |
| --- | --- | --- | --- | --- | --- | --- | --- | --- | --- |
| Polyamide resin (PA-66) | 85 | 95 | 100 | 75 | 85 | 85 | 85 | 85 | 85 |
| Polyacrylate resin (PAR) | 15 | 5 | — | 25 | 15 | 15 | 15 | 15 | 15 |
| Glycidyl-based compatibilizer | 0.05 | 0.15 | 0.05 | 0.05 | 0.05 | 0.05 | 0.05 | — | 0.05 |
| Inorganic nucleating agent | 1 | 3 | 1 | 1 | — | 1 | 1 | 1 | — |
| Organic nucleating agent | — | — | — | — | — | — | — | — | 1 |
| Glass fiber | 30 | 30 | 30 | 30 | 35 | 30 | 30 | 30 | 30 |
| Tetramethyl-based antioxidant | 0.1 | 0.3 | 0.1 | 0.1 | 0.1 | 0.1 | 0.1 | 0.1 | 0.1 |
| Phosphite-based antioxidant | 0.1 | 0.3 | 0.1 | 0.1 | 0.1 | 0.1 | 0.1 | 0.1 | 0.1 |
| Anti-hydrolysis agent | 1.0 | 2.0 | 1.0 | 1.0 | 1.0 | — | 1.0 | 1.0 | 1.0 |
| Lubricant | 0.2 | 0.5 | 0.2 | 0.2 | 0.2 | 0.2 | 0.2 | 0.2 | 0.2 |

Test Example

Physical properties and characteristics of the polyamide resin compositions prepared in Examples 1-2 and Comparative Examples 1-7 were evaluated, and the test results are presented in Table 2.

1. Visibility Related to Glycol Resistance

Maintenance in light transmittance was measured after specimens (50×78×3.2 mm) were immersed and aged in 50 vol % of an anti-freezing solution (an aqueous solution) at 120° C. for 144 hours. Reference value of initial visibility (light transmittance) is 30 or higher and that of visibility maintenance is 85% or higher.

2. Visibility Related to Heat Resistance

Maintenance in light transmittance was measured after specimens (50×78×3.2 mm) were heated and aged in an aging oven (100° C.) for 144 hours. Reference value of initial visibility (light transmittance) is 30 or higher and that of visibility maintenance is 90% or higher.

3. Visibility Related to Coloration Resistance

After visibility related to glycol resistance was measured by using specimens (50×78×3.2 mm), the level of pigmentation was evaluated with naked eyes, followed by the measurement of green level by colorimetry. Green pigmentation must not be observed. E*ab value is required to be within 10 relative to the initial specimens when measured by colorimetry.

4. Heat Resistance

Test was conducted according to ASTM D-648. Reference value is 235° C. or higher.

5. Tensile Strength

Test was conducted according to ASTM D-638. Reference value is 1,550 kg/cm² or higher.

6. Flexural Strength

Test was conducted according to ASTM D-790. Reference value is 2,500 kg/cm² or higher.

7. Flexural Modulus

Test was conducted according to ASTM D-790. Reference value is 75,000 kg/cm² or higher.

8. Izod Impact Strength

Test was conducted according to ASTM D-256. Reference value is 7.6 kg/cm² or higher.

According to the results in Table 2, polyamide resin compositions prepared in Examples have superior visibility maintenance related to heat resistance and glycol resistance over polyamide resin compositions prepared in Comparative Examples. Polyamide resin compositions prepared in Examples have thermal properties and mechanical strength equal to or better than those of polyamide resin compositions prepared in Comparative Examples. In particular, polyamide resin compositions prepared in Examples show remarkably improved visibility maintenance with respect to heat resistance and coloration resistance.

Although mechanical properties such as tensile strength and flexural strength of polyamide resin compositions prepared in Examples are not better than those of Comparative Examples, they meet the standard requirement for automobile reservoir tanks. Further, heat resistance and chemical resistance of polyamide resin compositions prepared in Examples are sufficiently high. In Comparative Example 1 where conventional materials were used, visibility maintenance related to heat resistance, glycol resistance and serious pigmentation was drastically decreased. Likewise, in Comparative Example 2, heat resistance and mechanical strength were drastically decreased and manufacturing cost was increased. In Comparative Example 3, processability was deteriorated and product appearance was inappropriate. In Comparative Example 4, overall visibility maintenance was observed to be lower than that of Comparative Example 1. In Comparative Example 5, mechanical strength was drastically lowered. In Comparative Example 6, physical properties, heat resistance and glycol resistance were drastically deteriorated due to incompatibility. In Comparative Example 7 where organic nucleating agent was used instead of inorganic nucleating agent, visibility maintenance was drastically decreased due to lowered heat resistance and yellowing discoloration (degradation).

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polyamide resin composition comprising:
   (a) 100 weight parts of a resin comprising a polyamide 66 resin and a modified polyacrylate resin in a weight ratio of 80:20-95:5;
   (b) 0.03-0.3 weight parts of a glycidyl-based compatibilizer;
   (c) 20-40 weight parts of a glass fiber having a particle diameter of 7-14 μm and being coated with 0.05-0.5 wt % of a coupling agent;
   (d) 0.5-5.0 weight parts of an inorganic nucleating agent;
   (e) 0.1-0.8 weight parts of an antioxidant;
   (f) 0.5-4.0 weight parts of an imide-based anti-hydrolysis agent; and
   (g) 0.1-1 weight parts of a lubricant.

TABLE 2

| Test | | Ex. 1 | Ex. 2 | C. Ex. 1 | C. Ex. 2 | C. Ex. 3 | C. Ex. 4 | C. Ex. 5 | C. Ex. 6 | C. Ex. 7 |
|---|---|---|---|---|---|---|---|---|---|---|
| visibility related to glycol resistance (%) | | 89 | 87 | 71 | 92 | 81 | 79 | 90 | 67 | 69 |
| visibility related to heat resistance (%) | | 95 | 92 | 50 | 98 | 83 | 88 | 85 | 62 | 45 |
| visibility related to pigmentation resistance | Naked eye evaluation | Appropriate | Appropriate | Inappropriate | Appropriate | Appropriate | Inappropriate | Appropriate | Inappropriate | Inappropriate |
| | Colorimetry (E*ab) | 8.6 | 9.2 | 14.4 | 6.4 | 8.7 | 10.4 | 8.9 | 12.1 | 18.8 |
| Heat resistance (° C.) | | 243 | 248 | 253 | 232 | 245 | 241 | 236 | 246 | 248 |
| Tensile strength (kg/cm²) | | 1,875 | 1,980 | 1,948 | 1,540 | 1,893 | 1,885 | 1,580 | 1,360 | 1,715 |
| Flexural strength (kg/cm²) | | 2,572 | 2,650 | 2,680 | 2,350 | 2,605 | 2,585 | 2,195 | 1,915 | 2,270 |
| Flexural modulus (kg/cm²) | | 84,870 | 86,050 | 87,750 | 76,500 | 84,740 | 84,750 | 74,870 | 75,950 | 83,675 |
| Impact strength | | 12.4 | 14.1 | 15.4 | 8.6 | 13.6 | 13.8 | 5.7 | 4.3 | 13.5 |

2. The polyamide resin composition of claim 1, wherein the modified polyacrylate resin has a melting point of 240-280° C. and a melt index of 5-30 g/10 minutes (measured at 270° C. and 2.16 kg).

3. The polyamide resin composition of claim 1, wherein the glycidyl-based reactive compatibilizer is glycidyl methacrylate.

4. The polyamide resin composition of claim 1, wherein the inorganic nucleating agent is a magnesium-based nucleating agent.

5. The polyamide resin composition of claim 1, wherein the inorganic nucleating agent has an average particle size of 2-6 µm.

6. The polyamide resin composition of claim 1, wherein the antioxidant is a mixture of a tetramethyl-based antioxidant and a phosphite-based antioxidant in the ratio of 2:1-1:2.

7. The polyamide resin composition of claim 6, wherein the tetramethyl-based antioxidant is bis-2,2,6,6-tetramethyl-4-piperidinyl-1,3-benzenedicarboxamide.

8. The polyamide resin composition of claim 6, wherein the phosphite-based antioxidant is tris-(2,4-di-t-butylphenyl)-phosphite.

9. The polyamide resin composition of claim 1, wherein the imide-based anti-hydrolysis agent is poly(1,3,5-triisopropyl-phenylene-2,4-carbodiimide).

10. The polyamide resin composition of claim 1, wherein the lubricant is ethylene bisteramide.

11. An automobile coolant reservoir tank prepared by molding the polyamide resin composition of claim 1.

12. A process of preparing a polyamide resin composition, which comprises:
   (a) introducing a mixture comprising 100 weight parts of a resin comprising a polyamide 66 resin and a modified polyacrylate resin in a weight ratio of 80:20-95:5; 0.03-0.3 weight parts of a glycidyl-based compatibilizer; 20-40 weight parts of a glass fiber having a particle diameter of 7-14 µm and being coated with 0.05-0.5 wt % of a coupling agent; 0.5-5.0 weight parts of an inorganic nucleating agent; 0.1-0.8 weight parts of an antioxidant; 0.5-4.0 weight parts of an imide-based anti-hydrolysis agent; and 0.1-1 weight parts of a lubricant;
   (b) melt-mixing and extruding the mixture at a temperature of 240-300° C. and a screw rotation speed of 250-400 rpm.

13. An automobile coolant reservoir tank prepared by molding the polyimide
resin composition prepared by the process of claim 12.

\* \* \* \* \*